Patented Mar. 9, 1943

2,313,615

UNITED STATES PATENT OFFICE 2,313,615

TITANIUM SOLUTION MANUFACTURE

L'Roche G. Bousquet, Baldwin, and David W. Young, Flushing, N. Y., assignors to General Chemical Company, New York, N. Y., a corporation of New York No Drawing. Application March 29, 1940, Serial No. 326,674

7 Claims. (Cl. 23—117)

This invention deals with manufacture of crystalloidal, relatively low acidity factor titanium salt solutions. The invention relates generally to methods for reducing the acidity factor of crystalloidal titanium salt solutions without disturbing their crystalloidal characteristics. More particularly, the invention is directed to methods for making, from crystalloidal relatively high acidity factor titanium salt solutions, crystalloidal titanium salt solutions having within certain limits any desired lower acidity factor, for example crystalloidal titanium salt solutions having acidity factors of around zero or even substantially less than zero, i. e., a minus acidity factor. While applicable to production of low acidity factor titanium salt solutions in general, for convenience and purpose of illustration the principles of the invention are herein discussed largely in connection with titanium sulfate solutions.

As known in the art relating to production and use of titanium sulfate solutions, percent "acidity factor" or "factor of acidity" (represented by F. A.) of a titanium sulfate solution is the ratio (multiplied by 100) of the so-called free $H_2SO_4$, (i. e., acid not combined with bases or with titanium as $TiOSO_4$) and the titanium equivalent acid based on $TiOSO_4$, (i. e., the acid constituent of $TiOSO_4$ as such). Free acid plus acid combined with titanium to form $TiOSO_4$ as such is designated "active acid". In terminology of the art, zero F. A. represents a condition in which all titanium in solution is present as titanyl sulfate ($TiOSO_4$), and 100% F. A. represents a condition in which all titanium is present as normal tetravalent titanium disulfate, $Ti(SO_4)_2$. Titanium sulfate solution containing less acid than needed to combine with bases other than titanium and to form $TiOSO_4$ with the titanium present is designated as having a minus acidity factor. For example, in a case where solution conditions are such that substantially all of the titanium has been precipitated out as hydrate, e. g., as a result of neutralization of all of the acid, F. A. of the mother liquor is about minus 100%. Similarly, F. A. of a titanium chloride solution is the ratio (multiplied by 100) of the so-called free HCl (i. e. acid not combined with bases or with titanium as $TiOCl_2$) and the titanium equivalent acid based on $TiOCl_2$ (i. e. the acid constituent of $TiOCl_2$ as such).

The crystalloidal state of titanium salt solutions is characterized by absence of colloidal titanium compound. A satisfactory test for absence of colloidal titanium is that which shows the absence of coagulated titanium when a simple of the solution to be tested is treated with an equal volume of standard C. P. concentrated (35–37%) hydrochloric acid. In practice of this test, any colloidal titanium in the sample is coagulated immediately on addition of hydrochloric acid. Should colloidal titanium content of the sample be substantial, coagulated material though suspended and unsettled is readily visible to the naked eye. If no coagulated material is visible the hydrochloric acid treated sample may be settled for a substantial period of time and filtered or centrifuged in a high-speed centrifuge. If analysis of the filtrate or of the centrifuged liquor shows the same total titanium (calculated as $TiO^2$) content by weight as did the sample prior to hydrochloric acid dilution, the sample tested contained no colloidal titanium. If analysis of the filtrate or the centrifuge liquor shows appreciably less total titanium than that of the sample prior to hydrochloric acid dilution, it will be evident the sample contained colloidal titanium in amount corresponding with the total titanium deficiency of the filtrate or centrifuge effluent subjected to analysis.

In practice, occasions arise in which it is desirable to have available crystalloidal titanium sulfate solutions of moderately low acidity factor say 40–60%, or of acidity factor in the neighborhood of zero or below. It is known that titanium sulfate solutions having acidity factors of the order of say 35–30% or possibly lower can be made by direct sulfuric acid attack on titaniferous ores. This procedure has two serious commercial disadvantages. First, in order to obtain low acidity factor it is necessary to use such a relatively small amount of sulfuric acid that titanium recovery from the ore is too low for commercial purposes. Second, low acidity factor solutions produced in this way, while of low F. A., almost invariably contain titanium in colloidal form with the result that, as known, such solutions are unstable on account of premature hydrolysis initiated by the presence of colloidal titanium.

Literature and patents describe production of solutions having low acidity factor, e. g., almost as low as zero. While F. A. may be low, such solutions are not crystalloidal because of presence of colloidal titanium compound. Further, it is known that acidity factor of a usual stock high F. A., e. g., 60–90%, titanium sulfate solution may be reduced by treatment of the same with acid binding or neutralizing agents. While possible by use of such materials to reduce F. A. of crystalloidal, high acid titanium sulfate solution to near zero, on account of the high colloidal titanium compound content formed as an unavoidable result of the way in which prior methods involving treatment of high acidity factor solutions with acid binding agents are carried out, low F. A. solutions produced by prior art methods contain large amounts of titanium in colloidal form, and hence are non-crystalloidal and extremely unstable.

ence of colloidal titanium and resulting instability that solutions made by these prior neutralizing methods are said to be useful as seeding agents in hydrolytic precipitation of metatitanic acid from titanium sulfate solutions.

In the present state of the art by far the bulk of titanium used is obtained by direct sulfuric acid attack on ores such as ilmenite. It is customary, in order to obtain satisfactory titanium extraction from ore and to form crystalloidal sulfate solutions which are stable and will not hydrolyze on storage, to use acid in quantity to form titanium sulfate solution having acidity factor from above say 55 to 100%, general practice being such that crude titanium sulfate solutions resulting from ore-acid digestion operation have acidity factors in the range of about 60–85%. Relatively high acidity factor solutions of this general type constitute the commercially more satisfactory starting solutions for making crystalloidal low acidity factor solutions in accordance with the procedure of this invention since such high acidity factor solutions are not only crystalloidal but are made in a way affording satisfactory titanium recovery from ore.

General objects of this invention are to provide methods for reducing acidity factor of crystalloidal titanium salt solutions without disturbing their crystalloidal status and to thereby make possible production of crystalloidal titanium salt solution having acidity factor lower than that of the initial crystalloidal titanium salt starting solution; to afford methods for reducing acidity of crystalloidal titanium salt solutions in such a way as to prevent colloidal titanium compound formation during acidity reduction; and to provide methods for making crystalloidal titanium salt solutions of low acidity factor from crystalloidal relatively high acidity factor titanium salt solutions by treatment of the same with acid binding agents comprising elements in metallic form. A more particular aim of the invention is to provide methods for making crystalloidal low F. A. titanium salt solutions by treatment of crystalloidal higher F. A. titanium salt solutions with metallic elements, and at the same time to avoid or minimize presence, in the final low acidity product, of titanous salt the disadvantages of which will subsequently appear.

In carrying out the invention as applied to production of low acidity factor titanium sulfate, a crystalloidal titanium sulfate solution used as starting or initial solution may be one of any suitable relatively high acidity factor. For example, such a solution may be prepared by digesting ground ilmenite with sulfuric acid, dissolving the digest cake in water, separating solid residue, concentrating and cooling to remove part of the iron as $FeSO_4.7H_2O$ and clarifying the liquor, all as known in the art. We reduce acidity factor of the resulting starting solution by incorporating metallic sodium or potassium to reduce acidity factor to the desired extent and at the same time prevent formation of any colloidal titanium compounds. Procedure we have discovered is such as to make it feasible to first secure satisfactory titanium extraction from titaniferous ores by fully adequate amount of acid with resultant production of crystalloidal titanium sulfate solution having high titanium concentration and relatively high acidity factor. Using a solution of this nature as starting solution, in accordance with the present improvements it is then possible to produce a crystalloidal titanium sulfate solution having within certain limits any desired predetermined lower acidity factors. In practical commercial operations, for reasons not important here, it is often desirable to subject to hydrolysis a titanium sulfate solution (e. g., to precipitate crude metatitanic acid) having acidity factor something less than the acidity factor of a typical titanium sulfate solution formed when titaniferous ores are digested with a sufficiently large quantity of acid as to obtain maximum commercially feasible titanium extraction from ore. The invention thus makes possible use in an ore-acid digestion operation of most favorable quantities of acid and production of crystalloidal relatively high acid factor titanium sulfate solutions, and thereafter by practice of the invention reduction and adjustment of acidity factor to provide, for example for a hydrolysis operation, a titanium sulfate solution having a desired acidity factor appreciably lower than the acidity factor of the crude titanium sulfate solution obtained from the ore-sulfuric acid digestion operation. The invention similarly provides satisfactory ways for making crystalloidal titanium sulfate solutions having any desirable low acidity factor, for example, production of a crystalloidal titanyl sulfate solution which, it will be understood, has an acidity factor of about zero.

In order to produce crystalloidal low F. A. titanium salt solutions from high F. A. crystalloidal titanium salt solutions by treatment of the same with acid binding agents, the feature of first importance is prevention of formation of any, even very small amounts, of colloidal titanium compounds. Investigations show that once colloidal titanium is produced, if only in a highly localized zone of a main solution the acidity factor of which is being reduced, regardless of care with which the subsequent acidity reducing may be carried out, a satisfactory crystalloidal solution is not obtained, apparently because colloidal titanium once formed, although in very small amounts, initiates production of further colloidal titanium in quantity sufficient to prematurely hydrolyze the whole solution.

We have discovered that in effecting acidity reduction of relatively high F. A. crystalloidal titanium salt solutions by treatment with metallic elements, to prevent formation of titanium in colloidal form and avoid or minimize presence of titanous salt in the finished product, the first of two closely related and interdependent physical control factors of primary importance is the feature of maximum temperature at which the acidity reducing operation is carried out, and the second is selection of the metallic elements used to reduce the acidity factor.

The following described temperature conditions apply to all modifications of the invention. Acidity reduction procedure should be effected while maintaining the reacting mass, of crystalloidal starting solution and acidity reducing medium, at temperature not higher than 60° C. to secure best results in reasonably large-scale work, and to minimize tendency toward formation of colloidal titanium, temperatures should be held preferably below 50° C. Minimum temperature is a matter of operating convenience. Should it be desired to crystallize out material such as ferrous sulfate, usually present in commercial titanium sulfate solutions, temperature may be around or slightly above room temperature, e. g., 30–35° C., according to the degree of fluidity desired in the reacting mass. However, even substantially lower temperatures do not in any way affect crystalloidal character of the solutions made in accordance with the invention. One of the surprising discoveries we have made is that acidity factor of titanium salt solution may be reduced by treatment of the same with alkali metal in metallic form without violent reaction and accompanying generation of heat. Although spontaneous combustion takes place when metallic sodium or potassium is added to water or to aqueous acid solution with or without iron salts, we find that reaction between these metallic elements and titanium salt solutions in which titanium concentration is 40 gpl. or greater takes place without violence or appreciable heat generation. It will be observed this discovery affords a marked operating advantage. Stock crystalloidal high F. A. titanium salt solutions are usually at room temperature. Hence, it will be seen practice of the invention does not necessarily require provision of a reaction vessel equipped with cooling coils to maintain temperatures as indicated.

Investigations from which this invention developed comprised study of the affects, with respect to formation of colloidal titanium compounds, of a large number of acid binding or neutralizing agents, including compounds and elements in metallic form, potentially available for acidity reduction of crystalloidal titanium salt solutions. Most basic compounds have a marked characteristic to cause what is believed to be "over-neutralization" of small portions of crystalloidal solution being treated, and to form in highly localized zones small amounts of colloidal titanium which, regardless of temperature conditions and precautions subsequently taken during the acidity reducing operation, initiate formation of further amounts of colloidal titanium and prevent ultimate production of crystalloidal, low acidity factor titanium salt solutions. Overcoming such characteristic involved used of certain operating conditions and precautions such as control of rate of incorporation of the acid binding compound with the solution being treated. It was observed further that in the case of certain metallic acid binding agents such as metallic iron and zinc, substantial quantities of titanous salt were formed as a result, it is thought, of reaction between titanic salt and hydrogen liberated when the main titanium salt solution, F. A. of which was to be reduced, was treated with acid binding agent such as metallic iron. Such titanous salt formation entailed either loss of titanium converted to titanous form or further treatment to reconvert titanous to titanic salt.

We have discovered that metallic sodium and potassium are well suited to effect acidity factor reduction of crystalloidal titanium salt solutions. We find the acidity reducing characteristics and properties of metallic sodium are such that it is possible to use this material without taking any special procedural or manipulative precautions to maintain all portions of the reacting mass in crystalloidal form and to prevent formation of colloidal titanium compounds. We have found further that the inherent acidity reducing properties of metallic sodium are of such nature that the formation of titanous salt during the acidity reducing operation is prevented.

We have also discovered that the acidity reducing properties and characteristics of metallic potassium, with respect to absence of requirement of any special procedural or manipulative precautions while incorporating with the main solution being treated, are the same as those of metallic sodium. We find that the properties of metallic potassium, as to prevention of formation of titanous salt, while not under all conditions coextensive with those of metallic sodium, are such as to either avoid or to greatly repress or minimize titanous salt formation as compared with that produced by use of other metals such as metallic iron.

In practice of the invention, the initial relatively high F. A. starting solution may be any crystalloidal titanium sulfate solution of suitable titanium concentration. Other conditions being equal, the higher the titanium concentration the less the tendency for formation of colloidal titanium. It is desirable to use starting solution of such titanium concentration, calculated as $TiO_2$, that at any subsequent stage of the process the $TiO_2$ concentration does not fall below about 65 gpl. Ordinarily, in practice of the process there is no appreciable decrease of titanium concentration. If for any reason particular operating conditions should be such that a decrease of titanium concentration takes place, provision for such decrease may be made by selecting an initial starting solution of suitable high $TiO_2$ concentration. Usually starting solutions of not less than 100–120 gpl. are sufficiently concentrated. At concentrations above 350 gpl., solutions as a rule are too viscous to work with conveniently. For best practical results, we prefer to employ starting solutions having $TiO_2$ concentrations within the range of about 100 to about 210 gpl.

Generally, initial acidity factor of the starting solution is not important, although of course F. A. of the starting solution is higher than the F. A. of the ultimate low acidity factor product solution. As a rule, the initial solution should have acid factor upwards of say 40%, since solutions made by the usual commercial methods of digesting ore and acid and having factors less than about 40% may be unstable and in some cases contain titanium in colloidal form. As stated, the usual run of crystalloidal titanium sulfate stock solutions formed by digesting titaniferous ores and sulfuric acid, have acidity factor in the middle or upper portion of the range of say 50 to 100%. Solutions of this type, when made according to approved plant practice are crystalloidal, have $TiO_2$ concentrations above 100 gpl., and are well suited for purposes of the present process. The invention is also applicable to production of low acidity factor solutions from initial solutions having higher acidity factors, e. g. well above 100%.

Iron content of starting solutions is not strictly material, although practically it is more desirable to use initial solutions relatively low in iron. As known in the art, the iron content of a titanium sulfate solution may be substantially reduced if desired by cooling or by concentrating and cooling and removing ferrous sulfate crystals formed. Ordinarily, iron concentration should be low enough so that crystallization of iron to any troublesome degree does not take place during operation. In practice, for example, $Fe/TiO_2$ weight ratio may range between 0.15 to 0.8.

In subsequent discussion and examples $TTiO_2$ represents total titanium concentration calculated as $TiO_2$, $RTiO_2$ represents reduced titanium (e. g., titanous sulfate), $TH_2SO_4$ represents total $H_2SO_4$, $FH_2SO_4$ represents free $H_2SO_4$, $AH_2SO_4$ represents active $H_2SO_4$, and per cent F. A. represents factor of acidity. Subsequent mention of "$TiO_2$ concentration" is intended to mean titanium concentration calculated as $TiO_2$.

To produce from given high acid factor titanium salt solution a solution of given lower acid factor, the amount of metallic sodium or potassium usually employed is the quantity theoretically needed to effect acidity reduction of the desired degree, which quantity may be determined by calculation. In some situations, because of particular operating conditions, it may be desirable to use a small excess of sodium or potassium, of the order of say 1–3% by weight of the theoretical quantity, which excess for any given set of operating conditions may be readily found by preliminary test. The only apparatus required for acidity reduction is a reaction vessel which may be equipped if desired with cooling coils arranged to facilitate the temperature maintenance previously stated. However, as indicated above, where the starting solution is initially at room temperature, cooling coils in the reaction vessel are unnecessary, this feature being one operating advantage afforded by the invention. The sodium or potassium may be charged into the vessel in any desired way, no precaution as to mode of feeding being necessary to avoid formation of colloidal titanium compound. During reaction, it is advisable to agitate. It will be understood that solutions of too low F. A. are unstable, and hence the total amount of acid binder used preferably should not exceed that required to reduce F. A. below about minus 35%.

With regard to production of low acid factor titanium sulfate solutions, the sodium or potassium used reacts with $SO_4$ radical of the starting solution and forms soluble sodium or potassium sulfate. In the case of metallic sodium, it is believed the reactions occurring may be summarized as follows: Sodium reacts with water and with $SO_4$ radical of the main solution forming NaOH and $Na_2SO_4$ respectively, and liberating hydrogen. The NaOH reacts with $SO_4$ radical of the main solution producing water and more $Na_2SO_4$. Acidity factor of the mass is reduced to the extent $SO_4$ radical of the main solution becomes associated with sodium. The amount of water formed is not more than that taken from the solution, this feature constituting another advantage of the invention; namely, that there is no measurable dilution and accompanying $TiO_2$ concentration decrease caused by formation in or introduction of water into the reaction mass. Another advantage is that on cooling of the low acidity product, $Na_2SO_4.10H_2O$ may be crystallized out, thus removing water from the mass, and forming a final product of higher $TiO_2$ concentration than the initial starting solution.

Other development work in connection with production of low F. A. titanium salt solutions by means of metallic elements such as iron and zinc shows that hydrogen is liberated during the acidity reduction reaction and most of such hydrogen, e. g. about 80%, reacts with titanic salt to form the titanous salt. In practice of the present process hydrogen is also liberted, but in the case of sodium we surprisingly find that the liberated hydrogen does not effect any reduction of titanium to titanous condition, nor of any ferric iron present in the mass to ferrous. In some instances a relatively small conversion of titanous salt and of ferrous iron, already in the main solution at the start, to titanic and ferric condition respectively has been noted. It is not known why in the case of metallic sodium, titanous salt is not formed. However, discovery of this phenomenon constitutes the basis of one important operating advantage afforded by the invention, i. e., prevention of loss of titanium as titanous salt or avoidance of the alternative of an added step of treating the low acidity product to convert titanous back to titanic form It has been found further that in most respects metallic potassium functions similarly to metallic sodium, except that under some conditions potassium prevents formation of titanous salt to a less marked degree than does the sodium. We have noted that at relatively low $TiO_2$ concentrations of the main solution, e. g., around 100–110 gpl., reactions brought about by potassium are the same as those of sodium, and potassium affords all of the operating advantages of sodium. At higher $TiO_2$ concentrations, e. g., 180–200 gpl. and above, when using potassium some small amount of titanous salt may form, the reason for which formation we have been unable to determine. However, even at high $TiO_2$ concentrations metallic potassium brings about material reduction of formation of titanous salt as compared with other materials such as metallic iron and zinc, and affords all of the other operating advantages characteristic of metallic sodium. In practice of the invention it is preferred to use metallic sodium.

Following are examples illustrative of the invention:

Example I

The crystalloidal high F. A. stock titanium sulfate starting solution used analyzed:

*Solution 1*

| | |
|---|---|
| $TTiO_2$ | 187 gpl. |
| $RTiO_2$ | 2.1 |
| Fe | 106.5 |
| $TH_2SO_4$ | 545 |
| $FH_2SO_4$ | 129 |
| $AH_2SO_4$ | 358 |
| Percent F. A. | 56.4 |
| Ratio $Fe/TiO_2$ | .57 |

To 100 ml. of this solution, 7 g. of metallic Na cut up into small pieces were added. This amount of Na is substantially that theoretically needed to give the desired acidity reduction. The mass was agitated continuously during addition of the sodium and temperature of the mass was below 35° C. The resulting low F. A. product analyzed:

*Solution 2*

| | |
|---|---|
| $TTiO_2$ | 192 gpl. |
| $RtiO_2$ | Zero |
| $Fe^{++}$ | 103.2 |
| $Fe^{+++}$ | 5.9 |
| $TNa_2SO_4$ | 198 |
| T titratable acid | 403 |
| $FH_2SO_4$ | Minus 29.5 |
| $AH_2SO_4$ | 206.5 |
| Percent F. A. | Minus 12.5 |
| Sp. gr. at 32° C | 1.75 |

To avoid salting out of $Na_2SO_4$ crystals, the finished solution was diluted with two parts of water by volume, and the herein-prescribed HCl test show the product was crystalloidal.

Example II 100 ml. of crystalloidal high F. A. titanium sulfate solution 3 was treated, while agitating mechanically, with 19 g. of metallic K. Analysis of the low acid product titanium sulfate produced, solution 4, showed that a small amount of titanous sulfate had formed. Reaction temperature did not exceed 38° C.

|  | Solution 3 | Solution 4 |
|---|---|---|
| $TTiO_2$ | 188 gpl. | 141 gpl. |
| $RTiO_2$ | 1.8 | 6.4 |
| Fe | 88.4 | 31.1 |
| $TK_2SO_4$ | None | 193.0 |
| $TH_2SO_4$ | 605 |  |
| T titratable $H_2SO_4$ |  | 206 |
| $FH_2SO_4$ | 219 | Minus 21.4 |
| $AH_2SO_4$ | 450 | 151.6 |
| Per cent F. A. | Plus 94.7 | Minus 12.36 |
| Ratio Fe/$TiO_2$ | 0.47 | 0.22 |
| Sp. gr. | 1.6 |  |

The product solution was diluted with two volumes of water to prevent salting out of $K_2SO_4$ and $FeSO_4 \cdot 7H_2O$, and the herein-specified HCl test showed the product was crystalloidal.

*Example III*

Crystalloidal high F. A. starting solution 5 (100 ml.) was treated with 6.02 g. of Na in one case and with 10.53 g. of K in a second case, while agitating. Temperature in neither instance exceeded 40° C. In both cases the resulting low F. A. product solutions 6 and 7 were crystalloidal as indicated by herein noted HCl coagulation test.

*Analysis*

|  | Starting solution 5 | Solution 6 made with Na | Solution 7 made with K |
|---|---|---|---|
| $TTiO_2$ | 102.6 gpl. | 104.2 gpl. | 103.6 gpl. |
| $RTiO_2$ | 1.6 | Zero | 0.2 |
| TFe | 39.1 | 39.2 (trace $Fe^{+++}$) | 39.3 |
| $TH_2SO_4$ | 312.4 |  |  |
| T titratable $H_2SO_4$ | 312.4 | 191 | 184 |
| $FH_2SO_4$ | 118.0 | Minus 5.6 | Minus 12.0 |
| $AH_2SO_4$ | 243.8 | 122.2 | 115 |
| Per cent F. A. | 94 | Minus 4.38 | Minus 9.54 |
| Ratio Fe/$TiO_2$ | 0.381 | 0.376 | 0.379 |
| Sp. gr. at 26° C. | 1.42 | 1.54 | 1.52 |

It will be noted that in treatment of relatively low $TiO_2$ concentration starting solution with metallic potassium, titanous salt was not only not formed but the amount of titanous salt contained in the initial solution 5 was decreased as shown by analysis of solution 7.

While the acidity factors of the products of all of the above examples are less than zero, it will be understood that products of higher or lower acidity factors may be made by the same procedures, varied only by the amount of metallic sodium or potassium used.

The principles of the invention are also applicable to production of crystalloidal low acidity factor solutions from high F. A. titanium salt solutions other than titanium sulfate. For example, a crystalloidal relatively high F. A. titanium chloride solution may be treated with sodium or potassium as indicated to produce crystalloidal low F. A. titanium chloride solutions.

We claim:

1. The method for making crystalloidal liquid titanium salt solution of predetermined acidity factor which comprises reacting an initial crystalloidal titanium salt solution, having an acidity factor higher than said predetermined factor, with material of the group consisting of metallic sodium and metallic potassium in amount equivalent to that needed to reduce acidity to said predetermined factor, and maintaining temperature of the reacting mass during said treatment at not more than 60° C.

2. The method for making crystalloidal liquid titanium salt solution of predetermined acidity factor which comprises reacting an initial crystalloidal titanium salt solution, having an acidity factor higher than said predetermined factor, with material of the group consisting of metallic sodium and metallic potassium in amount equivalent to that needed to reduce acidity to said predetermined factor, and maintaining temperature of the reacting mass during said treatment at not more than 50° C.

3. The method for making crystalloidal liquid titanium salt solution of predetermined acidity factor which comprises reacting an initial crystalloidal titanium salt solution, having an acidity factor higher than said predetermined factor, with metallic sodium in amount equivalent to that needed to reduce acidity to said predetermined factor, and maintaining temperature of the reacting mass during said treatment at not more than 60° C.

4. The method for making crystalloidal liquid titanium salt solution of predetermined acidity factor which comprises reacting an initial crystalloidal titanium salt solution of relatively low titanium concentration calculated at $TiO_2$ and having an acidity factor higher than said predetermined factor, with metallic potassium in amount equivalent to that needed to reduce acidity to said predetermined factor, and maintaining temperature of the reacting mass during said treatment at not more than 60° C.

5. The method for reducing the acidity of crystalloidal liquid titanium salt solution without disturbing the crystalloidal properties thereof which comprises reacting said solution with material of the group consisting of metallic sodium and metallic potassium, and maintaining temperature of the reacting mass during said treatment at not more than 60° C.

6. The method for reducing the acidity of crystalloidal liquid titanium salt solution without disturbing the crystalloidal properties thereof which comprises reacting said solution with metallic sodium, and maintaining temperature of the reacting mass during said treatment at not more than 60° C.

7. The method for reducing the acidity of crystalloidal liquid titanium salt solution without disturbing the crystalloidal properties thereof which comprises reacting said solution with metallic potassium, and maintaining temperature of the reacting mass during said treatment at not more than 60° C.

L'ROCHE G. BOUSQUET.
DAVID W. YOUNG.